Nov. 13, 1934. L. EGGER 1,980,719.
HEATING ELEMENT FOR ELECTRIC COOKING AND HEATING APPARATUS
Filed June 1, 1931
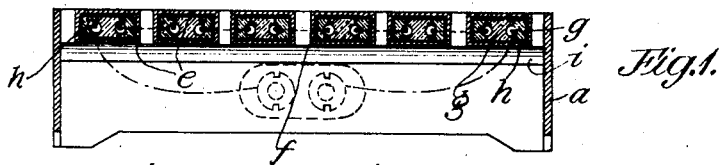
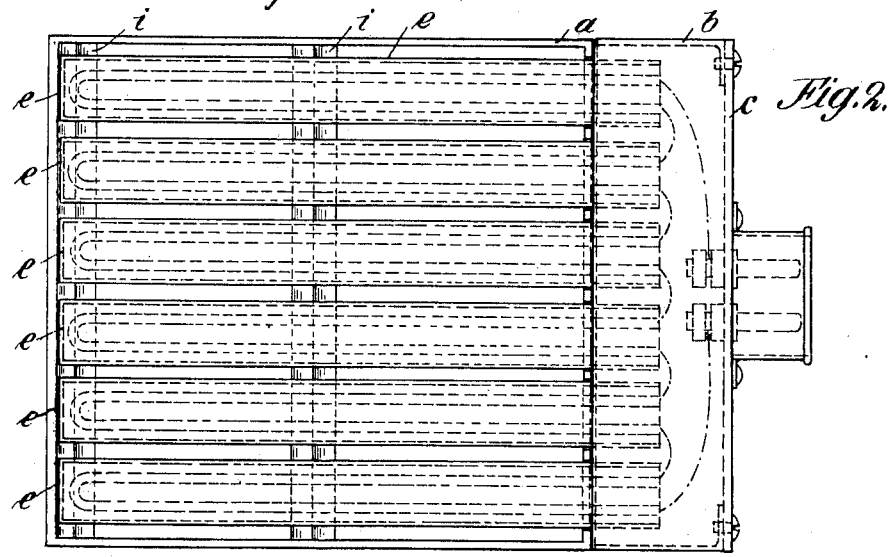
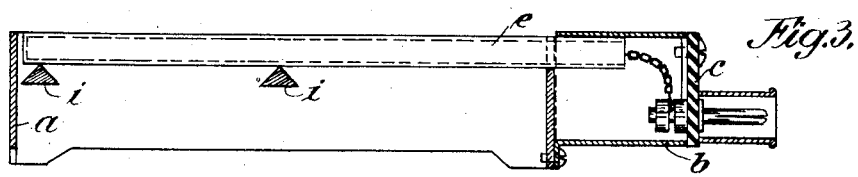
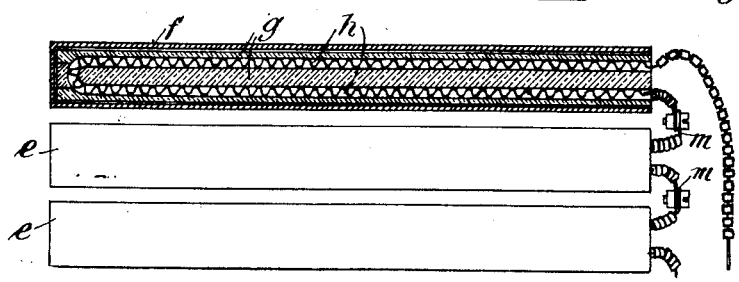
Inventor:
Leopold Egger
by
Attorney.

Patented Nov. 13, 1934

1,980,719

UNITED STATES PATENT OFFICE 1,980,719

HEATING ELEMENT FOR ELECTRIC COOKING AND HEATING APPARATUS

Leopold Egger, Bregenz, Austria, assignor to Volta G. m. b. H., Lindau, Germany

Application June 1, 1931, Serial No. 541,418
In Germany February 23, 1931

1 Claim. (Cl. 219—19)

This invention relates to an electric heating element for electric cooking and heating apparatus which are composed of individual incandescent rods fitted together in grid shape. The object of the invention is to enable the heat insulator of the individual incandescent rods to be easily exchanged. A further object of the invention is to enable the heating wire of each incandescent rod to be exchanged when burned out. A further advantage of the invention consists in the fact that the heating wires are placed loosely in the individual heat insulators of the incandescent rods and a bursting or cracking of the heat insulators made of ceramic material is not possible.

An embodiment of the invention is illustrated by way of example in the accompanying drawing in which:

Fig. 1 shows a cooking apparatus in cross section.

Fig. 2 is a top plan view of Fig. 1.

Fig. 3 is a longitudinal section of Fig. 1.

Fig. 4 shows an incandescent rod in longitudinal section and the arrangement of the leads between the individual incandescent rods.

The heating plate of the electric cooking and heating apparatus is, according to the invention, composed of separate rods or elements $e$ of refractory insulating mass $g$ and a metal sleeve $f$ with smooth surface. In the drawing a rectangular cross section of the rods has been chosen. The heating element $g$ of each element or rod $e$ consists of three longitudinal parts which are so constructed that when fitted together they form a U-shaped channel. In this channel the spirally wound heating wire $h$ is placed so that it extends twice through the heating element $g$ and both ends of this element project from the same end of the heating element. The metal casing $f$ is open at one end so that the heating element $g$ can be inserted or pulled out through this open end. The pulled out heating element $g$ drops into these longitudinal parts so that the heating wire $h$ is exposed and can easily be exchanged if it is burned through. The rods or elements $e$ are so arranged side by side that they form a grid like plate. The outer contour of this grid like plate can be made circular or angular by making the individual rods in suitable dimensions. For supporting the individual rods a suitable frame-shaped support $a$ is provided, the wall or wall side of which is so cut out that the individual rods rest on this wall and form a apart and held apart by suitable distance pieces. The rods or their metal casings $f$ are preferably rigidly welded or otherwise fixed on the bearing point of the frame wall. Transverse supports $i$ are also provided for affording additional support for the rods. These transverse supports are preferably of triangular or other suitable cross section and form only an edge support for the rods so that the least possible quantity of heat is imparted to these transverse supports. On one side of the frame $a$ a box $b$ is fitted into which the open ends of the rods project. The terminals for the individual rods are arranged in this box $b$. The other ends of the rods does not extend right up to the opposite wall of the frame, so as to allow the rods to expand during the heating. The heating wires $h$ of the individual incandescent rods are shown series connected in the drawing and the wires between every two rods are interrupted and detachably connected so that each rod can be separately exchanged. It is evident that the rods might also be connected in a similar manner in parallel in the feed circuit. The box $b$ is closed by a cover $c$ of insulating material so that the connecting wires are accessible. As the current flows to and from every incandescent rod, a very quick and uniform heating occurs. The grid like arrangement of the incandescent rods is suitable as supporting surface for the cooking vessel and for any article or material to be heated, and especially also as a grill.

I claim:—

An electric heating element for electric cooking and heating apparatus, comprising in combination a rod-shaped metal sleeve open at one end and closed at the other end, three insulating rods made of ceramic material inserted in a plane side by side in said metal sleeve and filling the same, the outer rods each having a longitudinal groove on its side adjacent said middle rod, said middle rod being shorter than the two outer rods and having two longitudinal grooves one on each side forming with the grooves in said outer rods passages of circular cross-section, a coiled resistance wire in said passages and bent around the inner end of said middle rod and adapted to be removed by pulling out said middle rod.

LEOPOLD EGGER.